UNITED STATES PATENT OFFICE.

JOSEPH BARDELLI, OF NEW YORK, ASSIGNOR TO NEW YORK FANCY BOX MANUFACTURING COMPANY, OF BROOKLYN, N. Y.

ORNAMENTING GLASS AND OTHER TRANSPARENT BODIES.

SPECIFICATION forming part of Letters Patent No. 241,590, dated May 17, 1881.

Application filed March 24, 1881. (No specimens.)

*To all whom it may concern:*

Be it known that I, JOSEPH BARDELLI, a citizen of Italy, residing at New York, county and State of New York, have invented new and useful Improvements in Ornamenting Glass or other Transparent Bodies, of which the following is a specification.

This invention consists in an improvement in ornamenting glass or other transparent bodies, the means employed being applied to the inner or under surface of the glass or other body to be ornamented by a new process or method of treatment, as hereinafter explained.

In carrying out my invention I coat the under or inner surface of the glass with varnish or oil. I then subject this coating or coated surface to the action of a smoky flame—as, for example, the flame of a candle or an ordinary lamp burning kerosene—whereby the varnish is dried and blackened, and collects on the surface of the glass in an irregular manner, producing light-and-shade effects when seen from the clean side of the glass. I then cover the smoked surface with a paint, water-color, or other coloring-matter of any shade I may desire for the particular work in hand, and subject this coating to the action of heat, so that it will dry and also crack slightly; or I allow it to dry in a cool place, so that it will remain continuous. The coating of paint imparts its own proper color or shade of color to the glass and to the previous coating, and also affects and protects that previous coating. If this last coating of paint is cracked, as above described, I underlay the coated glass with a colored surface of any substance transparent or of any shade—as, for example, with paper whose surface is covered with leaf or foil; or I may use for this purpose an additional coating of paint, of the same or different shade from the former.

By means of my invention I can produce an ornamented surface or appearance which is seen from the clean side of the glass, and can thus produce ornamented and tasteful borders to the glass coverings of pictures, boxes, or other articles, and can produce imitations of the appearance of tortoise-shell, marble, and other bodies whose surfaces show variegations of colors, transparencies, or handsome effects of light and shade.

My invention is applicable to the production of ornamental surfaces on glass or transparent substances used in picture-frames or photographs, and in general wherever glass or transparent bodies can be employed.

Either the whole or a portion of the glass or other body may be ornamented, according to the use to which it is to be put—as, for example, in picture-frames the ornamentation is applied only to the edge or border of the glass.

What I claim as new, and desire to secure by Letters Patent, is—

1. The within-described process of ornamenting glass or other transparent bodies by first applying thereto a coating of varnish, subjecting it to the action of a smoking or smoky flame, and finally covering or spreading over it a coloring-matter, substantially as and for the purpose described.

2. The within-described process of ornamenting glass or other transparent bodies by first applying thereto a coating of varnish, subjecting it to the action of a smoking or smoky flame, then covering or spreading over it a coloring-matter, subjecting the coatings to heat for producing fissures therein, then applying a coloring-matter in said fissures, or placing behind them substances of any color, to show through and diversify the ornamentation.

3. Articles of glass or other transparent bodies ornamented with a coat of varnish and having the appearance of having been smoked, and bearing a colored surface having in it fissures exposing a color or appearance differing from the color adjacent to said fissures, substantially as and for the purpose described.

In testimony whereof I have hereunto set my hand and seal in the presence of two subscribing witnesses.

JOSEPH BARDELLI. [L. S.]

Witnesses:
LORENZ HARR,
ALBERT REQUAND.